Patented Nov. 28, 1939

2,181,264

UNITED STATES PATENT OFFICE 2,181,264

MANUFACTURE OF CELLULOSE DERIVATIVES

Henry Dreyfus, London, England

No Drawing. Application June 18, 1937, Serial No. 148,968. In Great Britain July 16, 1936

7 Claims. (Cl. 260—231)

This invention relates to improvements in the manufacture of cellulose derivatives and particularly to improvements in the manufacture of cellulose ethers.

The usual method for the manufacture of cellulose ethers consists in reacting on cellulosic materials with etherifying agents containing the radicles of inorganic acids, for example dimethyl sulphate or ethyl chloride, in the presence of caustic soda or other strong inorganic base. This method, however, while capable of given a good yield of the cellulose ethers has the disadvantage that unless the etherification conditions are carefully controlled products which are degraded and which, consequently, do not yield artificial filaments and other materials of high tensile strength may be obtained.

I have now discovered that improved results may be obtained, particularly as regards avoidance of degradation of the cellulosic materials during etherification, by carrying out the etherification in the absence of strong inorganic bases, and employing instead tertiary aliphatic bases, the expression "aliphatic bases" being understood to include alicyclic bases. Examples of such bases are trimethylamine, triethylamine, dimethyl ethylamine, diethyl methylamine, ethyl diproplyamine, tripropylamine, tributylamine, triisobutylamine, methyl ethyl butylamine, ethyl propyl isobutylamine, dimethylamino-cyclobutane, -cyclopentane, -cyclohexane and -cycloheptane, diethylamino-cyclohexane, N-dimethyl cyclobutylmethylamine, dimethyl cyclobutyl-methyl-ammonium hydroxide, methyl-dicyclohexylamine and ethyl-dicyclohexylamine. Bases containing more than one substituted amino group, e. g. tetramethyl ethylene diamine, may also be employed. Bases containing alicyclic radicles, particularly dimethylamino cyclohexane, are especially valuable.

The process of the present invention is applicable to the etherification of unsubstituted cellulosic materials, for example cotton linters, wood pulp or regenerated cellulose, or cellulosic materials which already contain substituents groups, but which also contain free hydroxy groups or yield them under the conditions of reaction, as, for example, cellulose esters and partially etherified celluloses. The process is applicable to the etherification of cellulosic materials in fibrous, flake or similar form, but is particularly valuable for the etherification of cellulosic materials in the form of yarns, foils and other articles, for example cotton, regenerated cellulose and cellulose acetate yarns. Staple fibres may be etherified before or after conversion into spun yarn.

The process may be employed for the production of alkyl ethers of cellulose, for example using dimethyl sulphate or ethyl chloride as etherifying agent, for the production of aralkyl ethers using, for example, benzyl chloride, or for the production of hydroxy substituted or carboxy substituted cellulose ethers using, for example, epichlorhydrin, ethylene chlorhydrin, glycerol, chlorhydrin, cyclohexane chlorhydrin, chloracetic acid, ethyl chloracetate, ethylene oxide, propylene oxide, glycide, cyclohexene oxide or a methyl cyclohexene oxide. Preferably etherification is carried out in a substantially anhydrous medium. For example, very valuable results may be obtained by etherifying under such conditions that the water, if any, present does not exceed more than about four times the weight of the cellulose and preferably is not greater than about 1½ times its weight.

The amount of base employed with alkylene oxides and similar etherifying agents, e. g. cyclohexene oxide, is preferably of the order of two or three molecular proportions based on the cellulosic material. With chlorhydrins and other agents which form acid during the reaction the base should be present at least in a sufficient amount to neutralize any acid formed, for example in an amount up to two or three times as great.

Etherification may be effected in the presence or absence of a diluent. Examples of suitable diluents which may be employed are benzene, toluene, xylene and other aromatic hydrocarbons, aliphatic hydrocarbons, for example cyclohexane and ligroin, and halogenated hydrocarbons, for example chlorbenzene and carbon tetrachloride. Preferably, the diluent, if any, employed is a solvent both for the tertiary base and also for the etherifying agent.

Etherification may be carried out at relatively low temperatures, for example ordinary atmospheric temperature or temperatures up to 25 or 35° C., or higher temperatures, e. g. temperatures of 50°–70° C. or more, may be employed according to the nature of the etherifying agent and the other reaction conditions. Thus with methyl chloride or dimethyl sulphate temperatures of 15–25 or 35° C., are very suitable, while with benzyl chloride higher temperatures, e. g. 60–80° C. or more are in general preferable. The etherification may be effected by allowing the cellulosic material to remain in contact with the tertiary aliphatic base and the etherifying agent in a closed vessel if desired under pressure and with or without agitation until the desired degree of etherification is attained, or the organic base and/or the etherifying agent may be continuously circulated through the material. The etherifying agent may be employed in liquid or gaseous form and in the latter case may be admixed with air or nitrogen or other inert gas.

Etherification may be carried out under such conditions that the cellulose ether is obtained in fibrous form, or a diluent may be employed which is a solvent for the cellulose ether, in which case the ether may be precipitated from solution on completion of etherification, for example by introducing the solution into a non-solvent for the cellulose ether. The ether after separation from the other constituents of the reaction mixture may be washed with a suitable liquid and dried.

The process of the present invention may be continued until etherification is substantially complete, or may be interrupted at any suitable stage, for example when 1 or 2 of the hydroxy groups of the cellulose molecule have been etherified. Cellulose ethers obtained according to the present invention which contain free hydroxy groups may be further treated. For example, they may be esterified with acetic anhydride, acetyl chloride or other acid anhydride or acid halide in order to produce cellulose ether-esters.

Cellulose derivatives obtained according to the present invention may be employed in the production of artificial filaments, films and similar products, or for the manufacture of coating compositions, plastic masses and other industrial products.

The following examples illustrate the invention but are not to be regarded as limiting it:

Example 1

Cotton linters are etherified in an autoclave using ethylene oxide as etherifying agent and triethylamine as the base. The amount of ethylene oxide is 200–300% of that theoretically required to effect the desired degree of etherification, and the amount of base is about 200% of the weight of the linters. The reaction is carried out at a temperature of about 30 to 40° C. until the desired degree of etherification is effected, e. g. 4–10 hours.

Example 2

Regenerated cellulose yarn is immersed in an autoclave in a mixture of ethylene chlorhydrin and dimethylamino cyclohexane, the amount of ethylene chlorhydrin being about three times that theoretically required to effect the desired degree of etherification, and the amount of tertiary base being substantially in excess of that theoretically required to neutralise all the acid formed during the reaction. The mixture is maintained at a temperature of 20 to 30° C. until the desired degree of etherification has been effected which may require, for example, from 4–10 hours.

Example 3

Cellulose acetate yarn is etherified in a similar manner to that described in the preceding example using diethyl sulphate as etherifying agent and methyl piperidine as the base.

The products obtained according to the preceding examples are separated from the reaction mixtures, washed with a suitable non-solvent and dried.

Having described my invention what I desire to secure by Letters Patent is:

1. Process for the production of cellulose ethers from cellulosic materials containing or yielding free hydroxy groups, which comprises reacting such a cellulosic material with an etherifying agent in the presence of dimethylamino-cyclohexane.

2. Process for the production of cellulose ethers from cellulosic materials containing or yielding free hydroxy groups, which comprises reacting such a cellulosic material with ethylene oxide in the presence of dimethylamino-cyclohexane.

3. Process for the production of cellulose ethers from cellulosic materials containing or yielding free hydroxy groups, which comprises reacting such a cellulosic material with an etherifying agent in the presence of dimethylamino-cyclohexane, the reaction being carried out in a substantially anhydrous medium.

4. Process for the production of cellulose ethers from cellulosic materials containing or yielding free hydroxy groups, which comprises reacting such a cellulosic material with ethylene oxide in the presence of dimethylamino-cyclohexane, the reaction being carried out in a substantially anhydrous medium.

5. Process for the production of cellulose ethers from cellulosic materials containing or yielding free hydroxy groups, which comprises reacting cellulose acetate yarns with an etherifying agent in the presence of a tertiary alicyclic organic base.

6. Process for the production of cellulose ethers from cellulosic materials containing or yielding free hydroxy groups, which comprises reacting cellulose acetate yarns with an etherifying agent in the presence of dimethylamino-cyclohexane.

7. Process for the production of cellulose ethers from cellulosic materials containing or yielding free hydroxy groups, which comprises reacting yarns comprising regenerated cellulose with an etherifying agent in the presence of dimethylamino-cyclohexane.

HENRY DREYFUS.